March 14, 1939.　　　H. K. WEIHE　　　2,150,617
HYDRAULIC BRAKE
Filed Dec. 2, 1936　　　2 Sheets-Sheet 1

Inventor:
Hermann Kurt Weihe

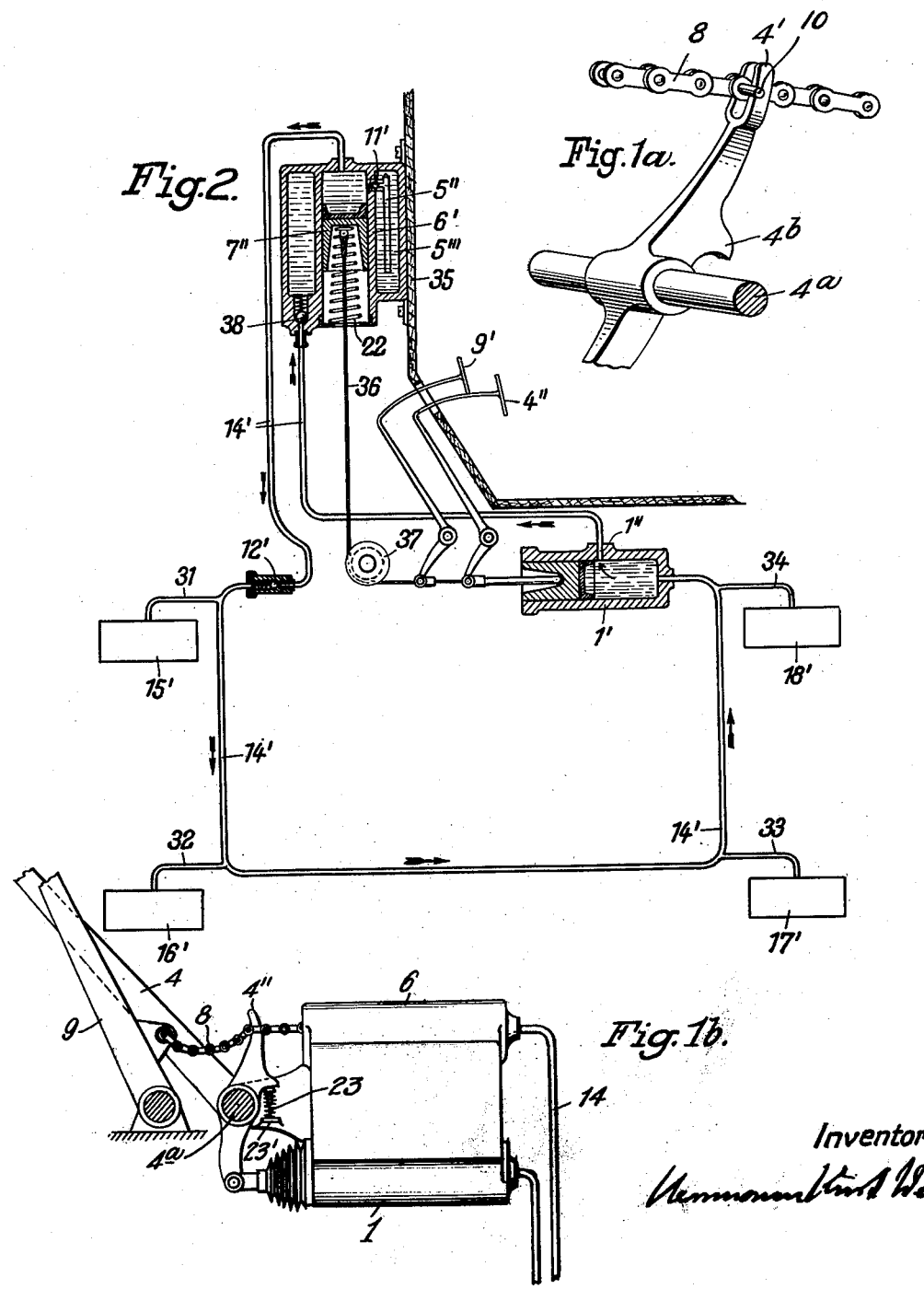

Patented Mar. 14, 1939

2,150,617

UNITED STATES PATENT OFFICE 2,150,617

HYDRAULIC BRAKE

Hermann Kurt Weihe, Berlin, Germany

Application December 2, 1936, Serial No. 113,902
In Germany December 5, 1935

6 Claims. (Cl. 188—152)

This invention relates to a method, and an arrangement for carrying out the method, for automatically removing air from hydraulic brakes, more particularly in automobiles. In brakes of this type it has hitherto been necessary, when filling the brake system with liquid, to take great care that the air is completely removed from the whole system. The presence of even small quantities of air in the pressure system considerably affects the reliable operation of the brake because air is highly compressible. The removal of air from the hydraulic brake system which is required from time to time is also very complicated and time-consuming; in addition a number of working forces are necessary for satisfactorily removing the air. There is also the further disadvantage that the individual points for removing air in vehicles are not easily accessible, so that the removal of air from the brake system is extremely troublesome.

The invention depends on the further knowledge that in destroying large energies of movement, more particularly in racing cars, commercial vehicles and heavy passenger vehicles there is a strong tendency to the formation of air bubbles. This is explained by the fact that the heat developed in braking is transmitted to the brake fluid. The temperature of brake fluid may then reach a level at which brake fluid begins to evaporate. This evaporation then leads to the formation of bubbles in the pipe circuit, whereby the satisfactory working of the brake becomes doubtful.

On the basis of the above facts the invention attacks the problem of constructing the hydraulic brake system in such a manner that the removal of air from the system can be effected during travel, that is, so to say, automatically. According to the invention this problem is solved essentially by the brake fluid in the brake off position being intermittently circulated by an additional feed device within a closed pipe circuit, and thereby being passed through an air separating space.

For carrying out this operation use is made preferably of a piston pump in which the delivery member, which can be driven, is connected with a movable part of the vehicle, for example with the brake lever or the clutch lever. The circulating pump is arranged in such a manner that it is cut off from the brake pipe while the brakes are being applied. The arrangement of the circulating pump further gives the advantage that, when actuating the brake, the circuit is at once filled so that any loss of liquid which may occur, especially when the vehicle has been standing for a long time, is immediately replaced.

Two constructional examples of the device according to the invention are illustrated in the accompanying drawings.

Fig. 1a is a perspective detail view of the brake pedal connection with the circulating pump.

Fig. 1b is an elevation illustrating the manner by which the clutch pedal or the brake pedal operates the circulating pump.

Fig. 2 shows a similar construction, also diagrammatically and partly in section.

Figures 1, 1C:
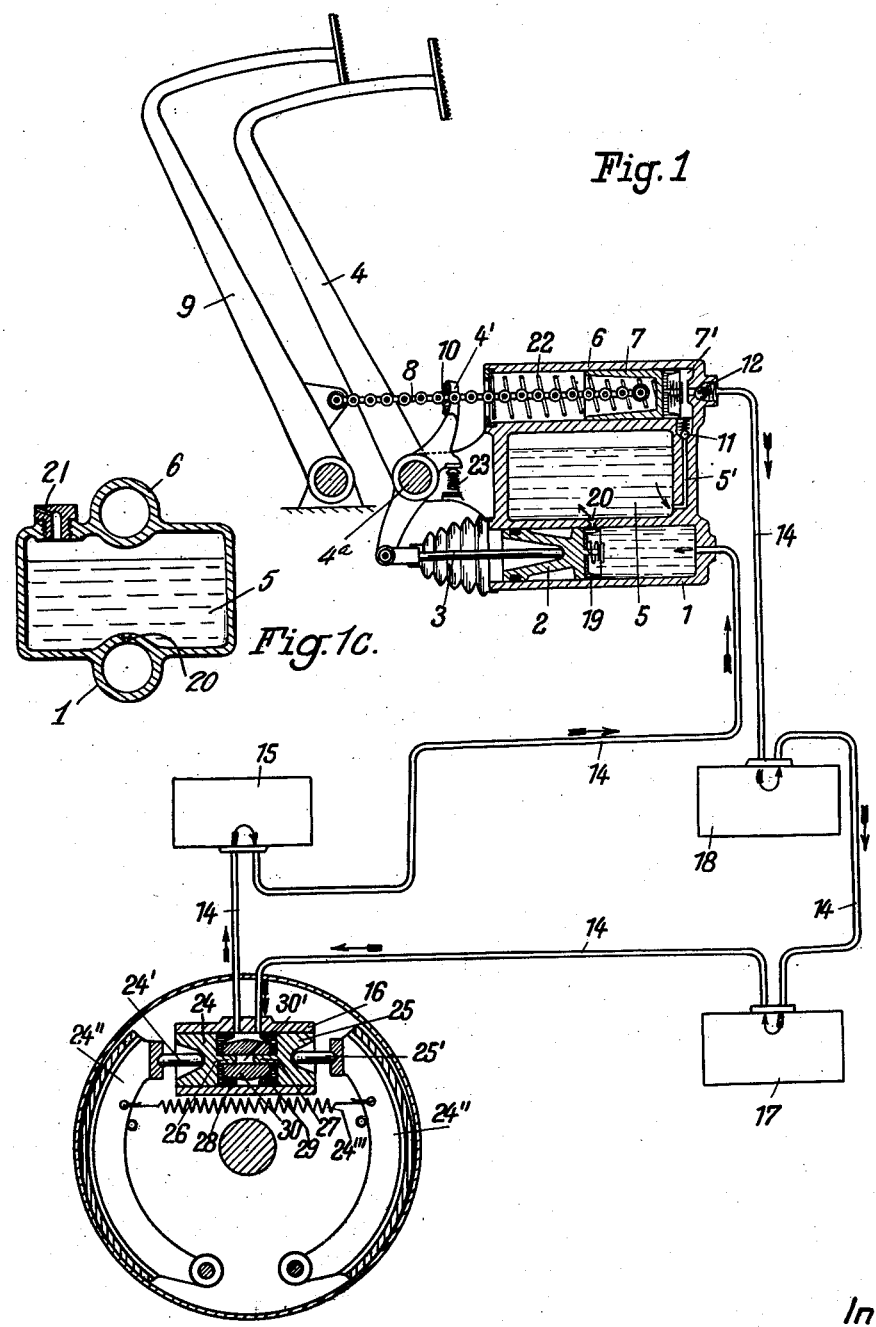
Fig. 1 shows the first construction of a hydraulic brake arrangement diagrammatically with the essential parts in longitudinal section.
Fig. 1c is a transverse sectional view of the fluid reservoir and the cylinders shown in Fig. 1.

In Fig. 1, 1 is the main pressure producing cylinder with the pressure piston 2 arranged therein, which is driven, as usual, by means of the rod 3 and the brake pedal 4. Above the pressure cylinder 1 is arranged the fluid container 5 and above this a pump cylinder 6, the piston 7 of which is connected through a chain 8 with the clutch lever 9. The two cylinders 1 and 6 lie parallel to one another and are cast in a block together with the fluid container 5 between them. On the chain 8 a driving member or an abutment 10 is provided, which rests from the front against the extension 4' of the pedal 4, so that the piston 7 is driven also when the pedal 4 is depressed. The working space of the pump 7 communicates with the container 5 through the passage 5', in which the suction valve 11 is arranged. At the outlet of the space 7' the one end of the brake pressure pipe 14 is attached through a pressure valve 12, in which pipe the wheel brake cylinders 15, 16, 17, 18 are interposed successively, of which the cylinder 16 is shown in longitudinal section. The brake pressure pipe 14 is in the form of a closed circuit which begins at the outlet of the main pressure cylinder 1 and at the other end opens into the working space of the pump 7. Between the two ends of the pipe lie the main pressure cylinder 1, the container 5 and the working space 7' of the pump 7. The fluid can return to the container 5 through an opening 20 controlled by the piston sleeve 19 in the wall of the cylinder 1.

Each brake cylinder contains, as usual, two pistons 24, 25, moving in opposite directions and having at their ends a packing sleeve 28, 29 of rubber or other suitable material. In the space between the two pistons 24, 25, is arranged a filling member 30 which diminishes the volume of this space. The filling member has a central boring 30', by means of which it is held on the pin-like projections 26, 27 which serve simultaneously as carriers for the packing sleeves 28, 29. The pistons 24, 25 are loosely in contact through the rods 24', 25' with the upper ends of the brake blocks 24". The brake blocks are arranged in the interior of the brake drum and are acted upon by a return spring 24"'. As shown by the cylinder 16 in section, the brake oil is delivered, and more particularly removed, at the highest point. The brake pedal 4 is supported on its shaft 4ª. In the normal position the brake pedal rests with a projection 4ᵇ thereof against a resilient abutment 23, preferably in the form of a spring, which rests on a ledge 23' and limits the release position of the pedal. This arrangement provides that, when there is return pressure from the interior of the brake the brake pedal can move backwardly, whereby the aperture 20 is opened.

The mode of operation of the brake system described is as follows:

When the brake system is filled either the clutch lever 9 or the brake pedal 4 is depressed a number of times like a pump, so that the piston 7 of the pump 6 is moved to and fro. The latter thereby delivers fluid from the container 5 into the circuit including the wheel brake cylinders and main cylinder. The air in the pipes and in the wheel brake cylinders is completely driven out of the brake system by the liquid column and finally, when the hole 20 is opened by the main piston 2 being pressed back, at the same time overcoming the yielding stop 23, passes into the container 5. There the air collects above the level of the liquid and escapes through an air outlet opening 21 as shown in Fig. 1c. When the brake system is completely filled with fluid and the necessary initial tension is reached, the oil filling opening in the container 5 is closed, so that the brake is ready for working.

The circulating pump or the piston 7 may be operated by the brake pedal 4 and by the clutch lever 9. If the brake pedal 4 is depressed, the end of this lever, which is connected to the piston rod 3, moves the piston 2 in the main pressure cylinder 1. At the same time, however, the extension 4' is moved to the left and bears against the abutment 10 so that the chain 8 during the operation of the pedal 4 pulls the piston 7 to the left. The piston 7 or circulating pump draws liquid out of the reservoir 5 through the pipe 5' and the valve 11 into the space 7' of the cylinder 6. During this sucking action, the spring 22, which acts on the piston 7, is compressed. If the brake pedal 4 is now released by the operator removing his foot, the pedal returns to its original position as shown in Figure 1. The extension 4' of the brake pedal then slides freely over the chain. The spring 22 forces the piston 7 in the direction of the valve 12 whereby the liquid in the space 7' is forced through the valve 12 and the pipe 14 into the wheel brake cylinder 18 and the brake pipe system. A portion of the liquid contained in the brake pipe system is thus displaced and forced out of the main pressure cylinder 1 through the hole 20 back into the reservoir 5. The hole is uncovered by the piston 2 being moved to the left, which movement is possible by means of the resilient abutment 23 so that the displaced liquid can pass out of the brake pipe system into the reservoir.

By repeatedly operating the brake pedal 4, the entire supply of liquid in the brake pipe system is gradually displaced within the closed circuit. Any air bubbles, which are contained in the brake pipe system, are thus automatically removed from the pressure producing spaces of the brake system and escape with the displaced liquid into the reservoir 5.

The circulation of the liquid within the brake pipe system in the above described manner also takes place when operating the clutch lever 9. When the clutch pedal is depressed, it carries along the chain 8 and the piston 7 is pulled to the left. The spring 22 is thereby stressed. As soon as the clutch pedal 9 is released, the operation within the brake pipe system takes place in the same manner as described above.

The circulation of the fluid in the brake system is effected more quickly the smaller is the amount of liquid to be circulated or greater is the delivery volume of the auxiliary pump. It is therefore advisable to make the diameter of the cylinder of the auxiliary pump 6 as great as possible and at any rate greater than the diameter of the main cylinder 1. The effective content of the pump 6 can also be increased by suitably altering the transmission ratio. By arranging the filling member 30 in the wheel brake cylinders considerable help is given in diminishing the quantity of fluid to be circulated in the brake system.

In Fig. 2 another construction of the invention is shown, in which, in contradistinction to the construction in Fig. 1, the main cylinder 1' and the pump 6' are separately arranged. The wheel brake cylinders 15', 16', 17', 18', are each connected by a branch pipe 31, 32, 33, 34 to a circulating pipe 14' arranged on the frame of the vehicle. The wheel brake cylinders are so arranged that the branch pipes rise from the pipe 14'. The pump 6' is preferably arranged on the dashboard 35 and it consists essentially of the same parts as in the construction in Fig. 1, but these parts are arranged in vertical plan. The cylinder of the pump 6' is surrounded by the liquid container 5"'. The pump piston 7" is connected with the clutch pedal 9' and the brake pedal 4" through the cord 36 or the like, which is guided on the pulley 37. The pump can thus be driven from both of these levers in this construction also.

The arrangement shown in Fig. 2 works as follows:

By actuating the clutch pedal 9' liquid is drawn out of the container 5"' through the suction valve 11'. The spring 22, which is thereby strongly stressed, when the operating lever of the pump is released forces the fluid sucked in by it into the pipe 14' connected to the outlet of this pump and further through the pressure valve 12' into the wheel brake cylinders and the main cylinder. The quantity of fluid in excess of that required for filling the brake is delivered through the return part of the pipe 14' attached to the lateral aperture 1" of the main cylinder 1' and through the valve 38 back to the container 5"'. The fluid in the brake system is set in circulation intermittently by the action of the pump. Since the branch pipes 31–34 have a high rise with respect to the pipe 14', the particles of air collecting in the cylinders rise automatically to the circulating pipe, from which they are conveyed into the container 5"' together with the circulated fluid, and there are made harmless.

By means of the above described invention not only is the removal of air from hydraulic brakes greatly simplified, so that it can be carried out by inexperienced persons, but at the same time provision is automatically made for constant subsequent air removal, since the driver sets the fluid in circulation when changing gear when he has to operate the clutch pedal.

The invention further has the result that the circulating pump ensures constant re-filling and maintenance of the initial stress in the brake circuit. When a vehicle with hydraulic brakes has been out of operation for a long time, it is found that at the first operation of the hydraulic brake the pedal can be depressed down to the floor-board without result, that is the brake fails because the necessary initial tension in the system has not been maintained. Only by repeated moving up and down of the brake pedal is the system re-filled so that the necessary initial stress for applying the brakes is obtained. In the meantime however, the failing of the brakes may have led to an accident.

With the present invention this danger does not arise. When starting it is of course necessary to change gear from neutral to the first, second and third speed and so forth, and this requires repeated operation of the clutch. During these movements at the same time the brake system is re-filled since the circulating pump is driven by the clutch pedal.

The invention further has advantages in cold weather. The liquid used at the present time in hydraulic brakes has the property of not freezing even in very cold conditions; the fluid however, contracts strongly. If the re-filling liquid of the brake system does not work satisfactorily it must be considered in this case that when the brake is actuated no result will be obtained owing to insufficient initial tension in the brake system, which involves great danger in driving.

This drawback is avoided when using the invention. The invention can be applied to aircraft, rail vehicles and other vehicles, as well as automobiles.

What I claim is:

1. In a hydraulic brake system for a motor vehicle having brake and clutch pedals, a liquid reservoir, a main cylinder and a pump cylinder, a closed circuit conduit system extending from the pump cylinder to the main cylinder including therein wheel brake cylinders, a piston arranged for reciprocation in said pump cylinder, a spring associated with said piston for moving the same in one direction, a second piston mounted in said main cylinder and connected to be positively moved by said brake pedal, a conduit extending from said reservoir into communication with the main cylinder, pulling means for moving the pump cylinder piston against the action of said spring during the depression of the brake pedal, and a conduit having a one-way valve therein for admitting liquid to said pump cylinder by suction when the pump piston is moved against the action of the spring whereby the liquid in the pump cylinder is circulated through the closed conduit system and returned to the reservoir upon release of the pump piston.

2. In a hydraulic brake system for a motor vehicle having brake and clutch pedals, a liquid reservoir, a main cylinder and a pump cylinder, a closed circuit conduit system extending from the pump cylinder to the main cylinder including therein wheel brake cylinders, a piston in said pump cylinder connected to the clutch pedal and adapted to draw liquid from the reservoir into the pump cylinder when the clutch pedal is depressed, a spring associated with said pump piston for forcing liquid from the pump cylinder and circulating the same in the conduit system when the clutch pedal is released, a second piston mounted for movement in said main cylinder, means for moving the piston of the main cylinder when the brake pedal is depressed, a conduit extending from the reservoir and terminating in the wall of the main cylinder at such a position as to be closed by the second piston during depression of the brake pedal and in the normal retracted position thereof, and yieldable means permitting abnormal retraction of the second piston so as to uncover the conduit terminating in the wall of the main cylinder whereby the fluid circulated by the pump may be moved through the main cylinder and into said reservoir.

3. In a hydraulic brake system for a motor vehicle having brake and clutch pedals, a closed circuit conduit system in which a main cylinder and wheel brake cylinders are interposed, a liquid reservoir, a circulating pump interposed in said circuit adapted to draw liquid from said reservoir during depression of the brake pedal, said circulating pump consisting of a cylinder and a spring actuated piston for forcing the liquid from the pump into the brake circuit during backward movement of the brake pedal, flexible means connecting the piston and the clutch pedal, an abutment fixed to said flexible means and an extension carried by the brake pedal adapted to engage said abutment during depression of the brake pedal to positively move said piston in one direction against the action of said spring.

4. In a hydraulic brake system for a motor vehicle having brake and clutch pedals, a liquid reservoir, a main cylinder and a pump cylinder, a closed circuit conduit system extending from the pump cylinder to the main cylinder including therein wheel brake cylinders, a piston arranged for reciprocation in said pump cylinder, a spring associated with said piston for moving the same in one direction, a second piston mounted in said main cylinder and connected to be positively moved by said brake pedal, a conduit extending from said reservoir into communication with the main cylinder, flexible means extending from the pump piston to the clutch pedal and adapted to be engaged by the brake pedal for moving the pump piston in a direction opposite to the action of said spring during depression of either pedal, and a conduit having a one-way valve therein for admitting liquid to said pump cylinder by suction when the pump piston is moved against the action of the spring whereby the liquid in the pump cylinder is circulated through the closed conduit system and returned to the reservoir upon release of the pump piston.

5. In a hydraulic brake system for a motor vehicle having brake and clutch pedals, a liquid reservoir, a main cylinder and a pump cylinder, a closed circuit conduit system extending from the pump cylinder to the main cylinder including therein wheel brake cylinders, a piston arranged for reciprocation in said pump cylinder, a spring associated with said piston for moving the same in one direction, a second piston mounted in said main cylinder and connected to be positively moved by said brake pedal, a conduit extending from said reservoir into communication with the main cylinder, an extension carried by said brake pedal, flexible means connecting said pump piston with said clutch lever and adapted to be engaged by said extension for positively pulling the pump piston against the action of said spring during depression of either pedal, and a conduit having a one-way valve therein for admitting liquid to said pump cylinder by suction when the pump piston is moved against the action of the spring whereby the liquid in the pump cylinder is circulated through the closed conduit system and returned to the reservoir upon release of the pump piston.

6. In a hydraulic brake system for a motor vehicle having brake and clutch pedals, a liquid reservoir, a main cylinder and a pump cylinder, a closed circuit conduit system extending from the pump cylinder to the main cylinder including therein wheel brake cylinders, a piston arranged for reciprocation in said pump cylinder, a spring associated with said piston for moving the same in one direction, a second piston mounted in said main cylinder and connected to be positively moved by said brake pedal, a conduit extending from said reservoir into communication with the main cylinder, flexible means extending from the clutch pedal to the pump piston and operably arranged to positively move the pump piston in a direction opposite to the action of said spring during depression of the clutch pedal, and a conduit having a one-way valve therein for admitting liquid to said pump cylinder by suction when the pump piston is moved against the action of the spring whereby the liquid in the pump cylinder is circulated through the closed conduit system and returned to the reservoir upon release of the pump piston.

HERMANN KURT WEIHE.